United States Patent [19]

McHale

[11] 4,354,666
[45] Oct. 19, 1982

[54] HIGH PRESSURE PACKLESS METAL DIAPHRAGM VALVE

[75] Inventor: Joseph P. McHale, Allison Park, Pa.

[73] Assignee: Kerotest Manufacturing Corp., Pittsburgh, Pa.

[21] Appl. No.: 158,888

[22] Filed: Jun. 12, 1980

[51] Int. Cl.³ ............................................. F16K 31/50
[52] U.S. Cl. ................................. 251/335 A; 251/214; 251/270; 251/272; 251/291
[58] Field of Search ............ 251/335 A, 335 B, 335 R, 251/266 T, 270, 272, 291, 318-321; 403/292, 297, 298

[56] References Cited

U.S. PATENT DOCUMENTS

| | | | |
|---|---|---|---|
| 2,621,016 | 12/1952 | MacGregor | 251/270 |
| 2,964,961 | 12/1960 | Gulide | 251/291 |
| 3,281,114 | 10/1966 | Milleville | 251/367 |
| 3,749,355 | 7/1973 | Paul, Jr. | 251/124 |
| 3,874,636 | 4/1975 | Bake et al. | 251/335 A |
| 3,874,636 | 4/1975 | Bake et al. | 251/335 A |
| 3,979,105 | 9/1976 | Pool et al. | 251/121 |
| 3,982,729 | 9/1976 | Tricini | 251/214 |
| 4,068,346 | 1/1978 | Binder | 403/292 X |
| 4,151,979 | 5/1979 | Visalli | 251/322 |
| 4,171,792 | 10/1979 | Bass | 251/335 A |
| 4,199,850 | 4/1980 | Velar | 29/157.1 R |
| 4,231,549 | 11/1980 | Visalli | 251/335 A |

FOREIGN PATENT DOCUMENTS 70826 4/1952 Netherlands ................. 251/335 A

Primary Examiner—A. Michael Chambers
Attorney, Agent, or Firm—Stanley J. Price, Jr.; John M. Adams

[57] ABSTRACT

A valve body has a chamber with a lower portion provided with inlet and outlet openings and an upper portion that includes a diaphragm seat having a surface with a preselected degree of roughness. An assembly of individual flexible metallic diaphragms is positioned in a stacked arrangement a graphite gasket positioned on the roughened diaphragm seat. A bonnet bolted to the valve body applies a downward bearing force upon the outer annular edge of the diaphragm assembly to secure the diaphragm assembly and gasket in sealing relation with the valve body to seal the chamber upper portion from the chamber lower portion. A yoke member is secured to the valve body in surrounding, spaced relation with the bonnet. A valve member has a disc portion arranged to move into and out of abutting relation with a valve seat of the valve body to control the flow of fluid under substantial pressure through the chamber. The upper end of the valve member abuts the lower surface of the diaphragm assembly, and the end of a valve stem abuts the top surface of the diaphragm assembly oppositely of the valve member. An upper end of the valve stem is nonrotatably connected to a bushing which is axially fixed for rotation within the yoke member and is removably connected by an adapter to an actuator that transmits rotation to the bushing. Rotation of the bushing axially advances the valve stem without rotation in the yoke member and the bonnet to raise and lower the valve stem and the valve member to open and close the valve. Upward thrust exerted upon the valve stem when the valve is closed under full line pressure is transmitted from the valve stem through the yoke member to the valve body so that the upward thrust is not applied to the bonnet and the bearing force exerted by the bonnet upon the diaphragm assembly is not reduced, thus preventing leakage around the diaphragm assembly.

15 Claims, 5 Drawing Figures

HIGH PRESSURE PACKLESS METAL DIAPHRAGM VALVE

BACKGROUND OF THE INVENTION

1. Field of the Invention

This invention relates to a diaphragm valve and more particularly to a high pressure packless metal diaphragm valve having a yoke member to valve body connection that facilitates the transfer of upward stem thrust from the valve stem to the valve body rather than to the bonnet when the valve is being closed under line pressures of substantial magnitude so that the bearing force exerted by the bonnet upon the diaphragm is not reduced and an effective seal is maintained around the diaphragm.

2. Description of the Prior Art

Conventionally known Y-diaphragm valves, as disclosed in U.S. Pat. Nos. 3,979,105, and 3,982,729, include a valve stem arranged for reciprocal movement in a yoke member of the valve. The yoke member may be threadedly secured, as illustrated in U.S. Pat. No. 3,979,105, to the upper end of a bonnet that extends axially into threaded engagement with the upper end of a valve body.

In the alternative, as disclosed in U.S. Pat. No. 3,982,729, the yoke member may be threadedly connected to the upper end of the valve body and extend into the upper end of the valve body chamber. With this arrangement the bonnet is concentrically positioned within the yoke member and valve body. The yoke member bears downwardly upon a flanged portion of the bonnet to, in turn, urge the bonnet into gripping engagement with the annular edge of a metallic flexible diaphragm. The diaphragm is supported at its lower surface upon an annular shoulder of the valve body.

In both of the above arrangements an enlarged head at the end of the valve stem bears upon the top surface of the diaphragm. The upper end of a valve member is resiliently supported within the lower portion of the valve body chamber and is maintained in abutting relation with the bottom surface of the diaphragm oppositely of the valve stem. The lower end portion of the valve member is positioned in overlying relation with a valve seat which connects inlet and outlet openings of the valve chamber.

A valve actuator is connected to the upper end of the valve stem. By rotation of the valve stem through the actuator the valve stem is movable upwardly and downwardly in the axially passageways of the yoke member and the bonnet. For example, upon downward movement of the valve stem, the diaphragm is downwardly deflected to transmit the downward movement to the valve member in the chamber lower portion. The spring assembly that maintains the valve member in a normally raised position from the valve seat is compressed by downward movement of the valve member and the valve member is moved into abutting, sealing relation with the valve seat to close the valve. Upward movement of the valve stem allows the spring assembly to raise the valve member off of the valve seat permitting fluid flow through the valve chamber between the inlet and outlet openings.

During the operation of the valve, to open or close the valve or to maintain the valve member in a preselected position between a closed or an opened position under full line pressure across the valve seat, the flexible diaphragm must be maintained in a position sealing the valve chamber lower portion from the valve chamber upper portion, particularly for valves handling contaminated fluids, such as radioactive fluids. To prevent leakage of fluid around the annular edge of the flexible diaphragm, the bonnet must apply a uniform downward bearing force upon the diaphragm annular edge. The bonnet must exert a bearing force required to maintain the diaphragm in sealed relation with the diaphragm seat under full line pressure.

A reduction in the bearing force applied to the diaphragm will result in leakage around the diaphragm. Diaphragm leakage is commonly experienced when the bearing force applied by the bonnet becomes unequally distributed on the annular edge of the diaphragm. If the bearing force is nonuniform, then the diaphragm will deflect in an irregular manner resulting in leakage around the diaphragm. It is well known that diaphragm leakage will eventually result in diaphragm failure by pressure blow-out of the diaphragm.

Diaphragms valves of the above type are commonly utilized to control the flow of contaminated fluids as encountered in nuclear power plants and the like. In this application of use, the diaphragm valve is frequently operated to maintain the valve member in a throttled position, i.e., in an intermediate position between an opened and closed position. When the valve member is maintained in a throttled position or is moved downwardly to engage the valve seat against full line pressure extreme upward thrust forces are exerted upon the valve member and transmitted to the valve stem. These upward thrust forces must be resisted in order to maintain the valve stem and the valve member in a preselected axial position relative to the valve seat and to prevent a reduction in the bearing force applied by the bonnet to the diaphragm.

In the known diaphragm valves the problem of transmitting the stem thrust from the valve stem to the bonnet and the yoke member is experienced. The upward stem thrust tends to relieve or reduce the downward bearing force applied by the bonnet upon the diaphragm. This condition can result in irregular deflection of the diaphragm leading to diaphragm leakage and eventual failure by blow-out of the diaphragm. Therefore, there is a need in Y-type diaphragm valves and particularly packless metal diaphragm valves, that are utilized to control fluid pressures requiring stem forces in excess of 100,000 lbs., to provide an internal valve structure that prevents the transmission of upward thrust forces from the valve stem to the bonnet and permits efficient replacement of the diaphragm assembly in the valve.

U.S. Pat. Nos. 2,382,235; 2,618,458; 2,812,777; 2,986,372; 3,955,794; and 3,874,636 also disclose diaphragm valves each having a bonnet externally threaded and engaging the internal threads of the valve body or housing to maintain the bonnet axially fixed in compressive relation with the flexible diaphragm. As discussed above this arrangement is also subject to a reduction in the seat force exerted by the bonnet upon the diaphragm by the transmission of upward thrust forces from the valve stem to the bonnet. In addition the arrangement of threadedly connecting the bonnet to the valve body is undesirable when the diaphragm is to be routinely replaced after a selected number of cycles of operation. The diaphragm can not be efficiently replaced if the bonnet must be unthreaded from its connection to the valve body. It is also known to encounter "freezing" of the bonnet to the valve body in a threaded connection. Thus to free the bonnet from the valve body in order to replace the diaphragm may require a substantial downtime for the valve and result in damage to the threads on the bonnet and valve body.

Of the above listed patents, U.S. Pat. Nos. 2,618,458; 3,874,636; and 3,955,794 disclose a connection of the yoke member to the bonnet whereby the bonnet is connected at an upper end to the yoke member and a lower end to the valve body. With this arrangement, the upward stem thrust is transmitted directly to the bonnet. The affect is a reduction in the bonnet bearing force upon the diaphragm. At high pressures this can result in loosening of the bonnet and leakage around the diaphragm.

U.S. Pat. Nos. 2,032,316 and 2,144,754 disclose a bolted connection between the bonnet and the valve body. The bonnet and the valve body include oppositely positioned radially extending flange portions provided with aligned bores for receiving a plurality of threaded fasteners or bolts. The flexible diaphragm is supported by a seat or ledge of the valve body. An external flange portion of the bonnet is positioned in overlying abutting relation with the annular edge of the diaphragm. The bonnet is secured to the valve body so that the bonnet is urged into compressive relation with the top surface of the diaphragm to exert a downward bearing force upon the diaphragm to maintain a fluid-tight seal between the bonnet and the valve body around the annular edge of the diaphragm.

In high pressure applications the valve stem may be subjected to a full line pressure resulting in upward thrust forces in excess of 100,000 lbs.. Consequently the bonnet must be securely bolted to the valve body to prevent a reduction in the bonnet bearing force and leakage around the diaphragm. This requires a substantial number of bolts arranged in a circular pattern on the bonnet. In order to accommodate the large number of bolts needed to generate the bearing force necessary to prevent leakage around the diaphragm when subjected to full line pressure, the bolt circle must have a substantial diameter.

When the upward stem thrust is transmitted to the bonnet, the bonnet bolts are subjected to linear deflection. U.S. Pat. No. 2,144,754 is an example of a diaphragm valve having a relatively large diameter bonnet bolt circle in order to accommodate a large number of bonnet bolts. Linear deflection of the bolts resulting from upward stem thrust loosens the bonnet bolts. Consequently, a non-uniform bearing force is applied by the bonnet and leakage develops around the diaphragm because the diaphragm is deflected irregularly around the outer edge thereof.

The greater the bonnet circle, the greater the number of bolts that are required to connect the bonnet to the valve body. This arrangement increases the difficulty of maintaining a constant and uniform bearing force upon the outer annular edge of the diaphragm. Thus for diaphragm valves having a relatively large bonnet bolt circle difficulty is frequently experienced in maintaining an effective seal around the diaphragm. Because a large bearing force of a constant magnitude is required any deviation in the forces generated by the bonnet bolts result in deflection of the diaphragm and diaphragm leakage.

While it has been suggested by the prior art diaphragm valves to secure the bonnet to the valve body and/or to the yoke member in a manner to maintain the bonnet in compressive relation with the diaphragm to prevent leakage around the diaphragm, the known valves are subject to diaphragm leakage by the transmission of upward stem thrust from the valve stem to the bonnet. Also the known arrangements do not facilitate efficient replacement of the diaphragm in high pressure diaphragm valves.

Therefore, there is need for a large high pressure packless metal diaphragm valve having internal valve structure that prevents the transmission of stem thrust to the bonnet so as to prevent a reduction in the bearing force upon the diaphragm. There is also need in high pressure diaphragm valves having the bonnet bolted to the valve body to reduce the diameter of the bonnet bolt circle so as to reduce the number of bolts that connect the bonnet to the valve body to maintain the bearing force equally distributed around the outer annular edge of the diaphragm.

SUMMARY OF THE INVENTION

In accordance with the present invention there is provided a diaphragm valve that includes a valve body having a chamber therein with an upper portion and a lower portion. The valve body has an exterior flange portion extending radially from the chamber upper portion and an internal annular edge positioned in the chamber upper portion. The lower portion has inlet and outlet openings communicating with the chamber lower portion. A valve seat is provided in the chamber lower portion between the inlet and outlet openings. A valve member is positioned for axial movement in the chamber lower portion in overlying relation with the valve seat to control the flow of fluid through the chamber lower portion between the inlet and the outlet openings. A flexible diaphragm is positioned in the chamber in overlying relation with the valve member and is supported by the valve body internal annular edge. The flexible diaphragm is arranged to seal the chamber lower portion from the chamber upper portion. The flexible diaphragm has a top surface and a bottom surface. The valve member is positioned in abutting relation with the diaphragm bottom surface. A bonnet is positioned in the chamber upper portion in overlying abutting relation with the flexible diaphragm on the valve body internal annular edge. The bonnet has a radially extending flange portion positioned above the valve body flange portion. Fastener means extend through the bonnet flange portion and into the valve body flange portion for rigidly connecting the bonnet to the valve body to securely retain the bonnet in gripping engagement with the flexible diaphragm on the valve body internal annular edge. The bonnet has a passageway therethrough. A valve stem extends through the bonnet passageway for longitudinal movement relative thereto. The valve stem has a lower end portion abutting the diaphragm top surface and an upper end portion. Actuator means connected to the valve stem upper end portion moves the valve stem to transmit movement through the flexible diaphragm to the valve member for closing and opening the valve. A yoke member is positioned in surrounding relation with the bonnet and the valve stem between the valve body and the actuator means. The yoke member has an upper end portion and a lower end portion. The yoke member lower end portion has a radially extending flange positioned in overlying abutting relation with the valve body exterior flange portion and in surrounding relation with the bonnet flange portion. Connecting means connects the yoke member radially extending flange to the valve body exterior flange portion. The valve stem is supported for longitudinal movement in the yoke member so that stem thrust applied to the valve stem upon closing the valve member under pressure is transmitted through the yoke member to the valve body to thereby relieve the bonnet of forces acting to disengage the bonnet from gripping engagement with the flexible diaphragm.

Further in accordance with the present invention there is provided a diaphragm valve that includes a valve body having a chamber therein with an upper portion and a lower portion. The lower portion has inlet and outlet openings communicating with the chamber lower portion. A valve seat is positioned in the chamber lower portion between the inlet and outlet openings. A valve member is positioned for axial movement in the chamber lower portion in overlying relation with the valve seat to control the flow of fluid through the chamber lower portion between the inlet and outlet openings. A flexible diaphragm is positioned in the chamber in overlying relation with the valve member and arranged to seal the chamber lower portion from the chamber upper portion. The valve body has a diaphragm seat surrounding the chamber upper portion. The flexible diaphragm has a body portion positioned on the diaphragm seat to support the flexible diaphragm in the chamber. The diaphragm seat has a roughened surface with a preselected degree of roughness to increase the sealing engagement of the diaphragm with the diaphragm seat. A bonnet is positioned in the chamber upper portion in overlying relation with the diaphragm. The bonnet has a passageway therethrough. A valve stem extends through the bonnet passageway for longitudinal movement relative thereto. The valve stem has a lower end abutting the top surface of the diaphragm and being operable to transmit movement through the diaphragm to the valve member for opening and closing the valve. The bonnet has a lower annular end portion extending into the chamber upper portion and positioned in abutting relation with the top surface of the diaphragm to securely retain the diaphragm between the bonnet lower annular end portion and the roughened surface of the diaphragm seat.

The flexible diaphragm is preferably an assembly of individual flexible metallic diaphragms having a preselected thickness and arranged in overlying relation to form a stack of diaphragms that are positioned on the roughened surface of the diaphragm seat. The stack of flexible diaphragms is flexible to the degree necessary to permit axial movement of the valve member in the chamber lower portion and has the structural strength to resist fluid pressures in excess of 2,500 p.s.i. within the chamber lower portion. A further feature of the present invention includes the provision of a compressible gasket, such as a graphite gasket, positioned on the roughened diaphragm seat abutting the bottom surface of the diaphragm assembly. The graphite gasket deforms under compression by the bonnet bearing force on the roughened diaphragm seat and is locked in sealing engagement with the bottom surface of the diaphragm assembly. The combination of the roughened diaphragm seat and the graphite gasket serves to substantially extend the cycle life of the flexible diaphragm assembly and to maintain an effective fluid-tight seal between the chamber upper and lower portions.

The radially extending flange portion of the bonnet is preferably bolted to the valve body flange portion so that the lower annular end portion of the bonnet is securely clamped to the top surface of the diaphragm assembly. This arrangement also facilitates efficient replacement of the diaphragm assembly. The downward compressive forces exerted by the bonnet on the diaphragm assembly securely retain the diaphragm assembly on the diaphragm seat. By maintaining the diaphragm assembly locked in sealing engagement with the diaphragm seat, the cycle life of the diaphragm assembly is substantially increased and a more effective seal is provided.

Accordingly, the principal object of the present invention is to provide a high pressure packless metal diaphragm valve having a yoke member to valve body connection that facilitates the transmission of stem thrust, encountered when the valve disc is closing under substantial line pressure, from the valve stem through the yoke member to the valve body and thereby prevent the stem thrust from being transmitted to the bonnet.

Another object of the present invention is to provide a high pressure diaphragm valve having a valve body with a roughened diaphragm seat arranged to support a plurality of flexible metal diaphragms in a stacked arrangement and maintained in locked sealing engagement with the diaphragm seat by the lower end of a bonnet bearing upon the upper surface of the diaphragm stack.

An additional object of the present invention is to provide a metal diaphragm valve of an increased size range heretobefore unknown for metal diaphragm valves and having a diaphragm construction and a diaphragm support structure capable of withstanding substantially higher fluid pressures and valve stem forces than conventionally known metal diaphragm valves are capable of withstanding.

A further object of the present invention is to provide a high pressure diaphragm valve arranged for efficient replacement of the diaphragm in the valve and adaptable for use with more than a single type of valve actuator.

These and other objects of the present invention will be more completely disclosed and described in the following specification, the accompanying drawings, and the appended claims.

DESCRIPTION OF THE PREFERRED EMBODIMENTS

Figure 1:
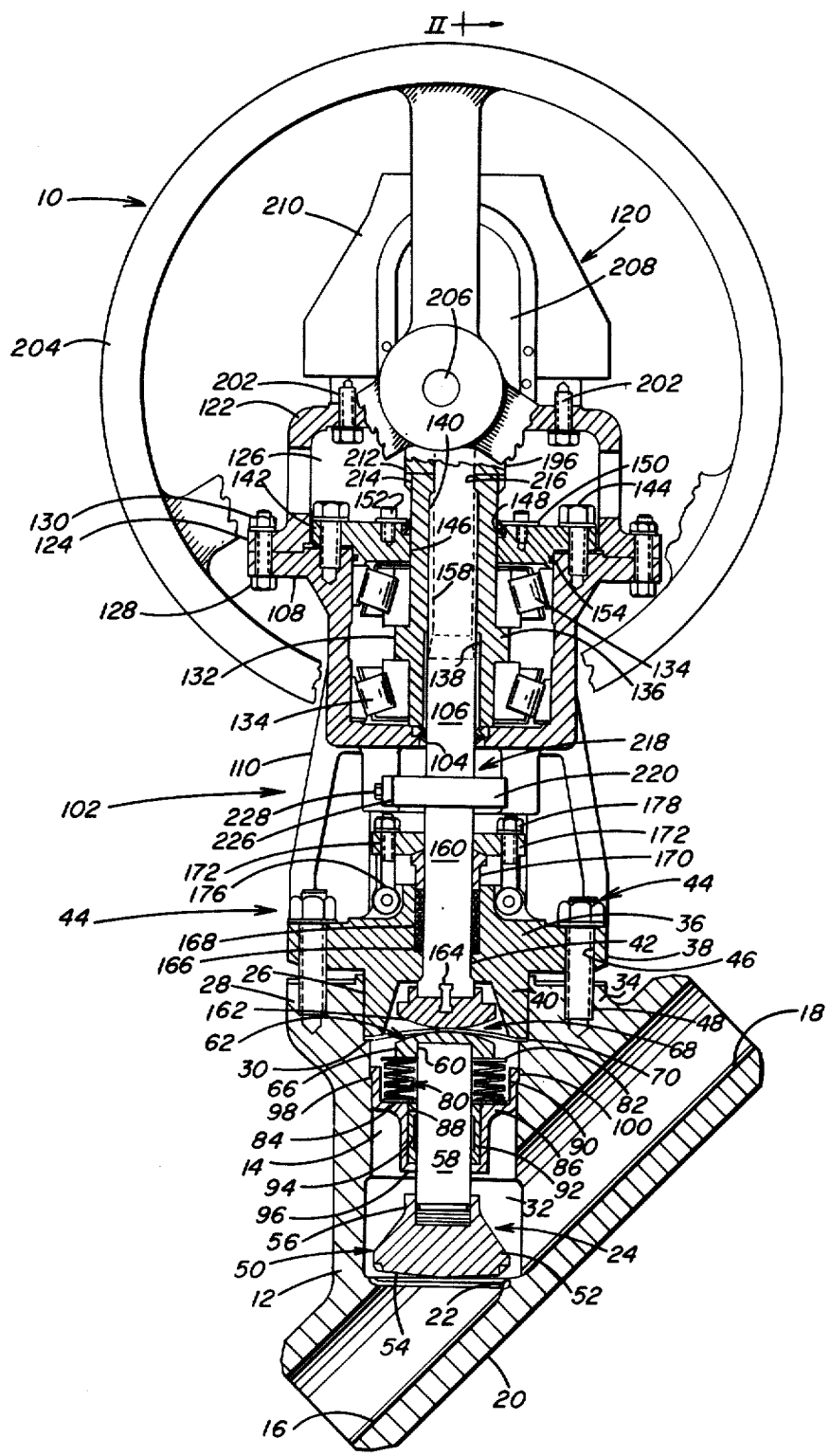
FIG. 1 is a sectional view in side elevation of a packless metal diaphragm valve, illustrating, a bonnet bolted to a valve body and applying a bearing force to a diaphragm assembly.
Figure 2:
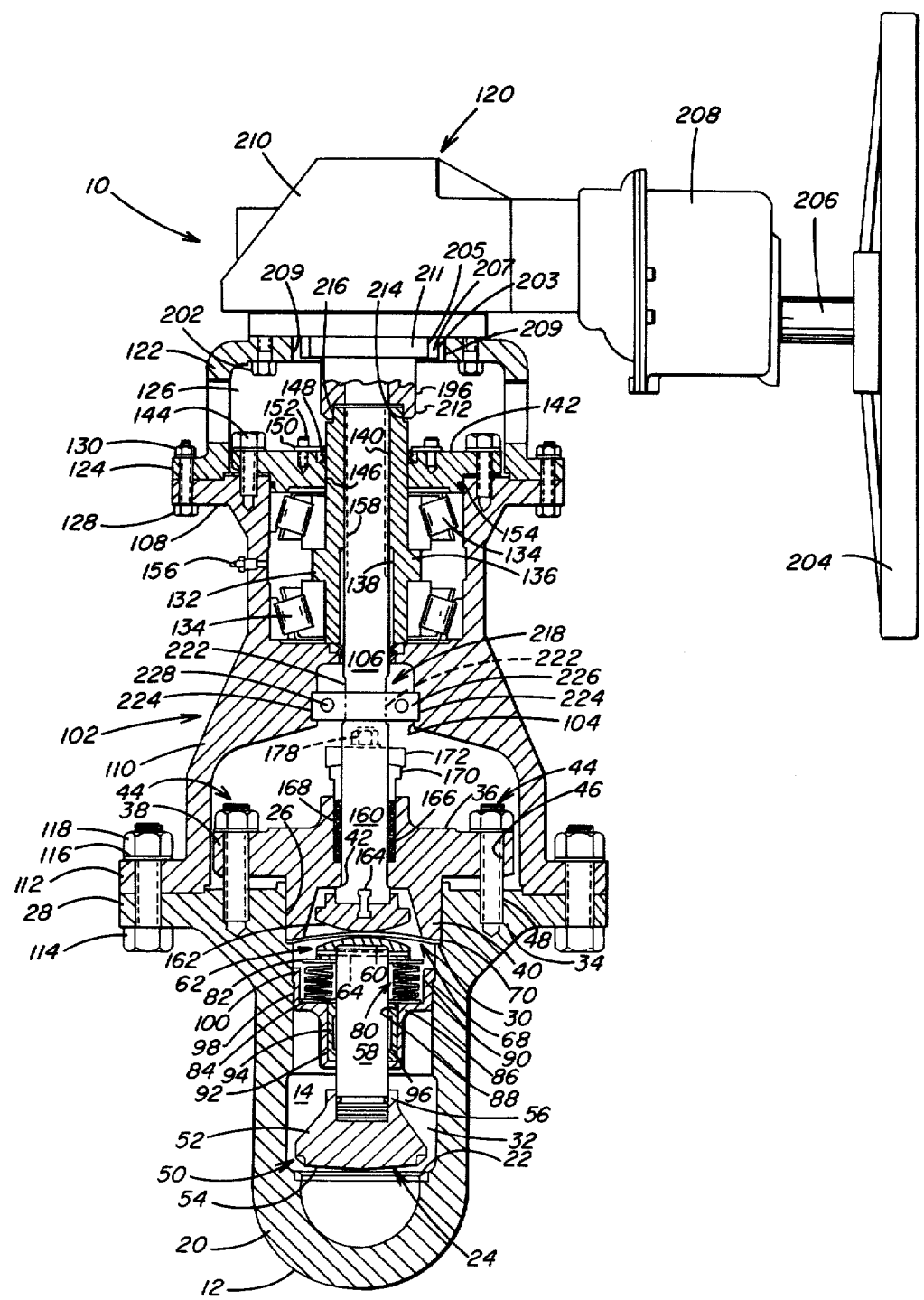
FIG. 2 is a sectional view in side elevation of the diaphragm valve taken along line II—II of FIG. 1, illustrating a valve member in an open position to permit fluid flow between the inlet and the outlet of the valve.

Referring to the drawings, and particularly to FIGS. 1 and 2, there is illustrated a high pressure packless metal diaphragm valve generally designated by the numeral 10 having a Y-shaped body portion 12 with an elongated chamber 14 therein. Inlet and outlet openings 16 and 18 communicate with the chamber 14 for the flow of fluid therethrough. The body portion 12 has a base portion 20 with an annular valve seat 22. A valve assembly or member generally designated by the numeral 24 is positioned in overlying relation with the valve seat 22 and is arranged to move into and out of abutting and sealing relation with the valve seat 22 to control the flow of fluid under pressure between the inlet and outlet opening 16 and 18. The chamber 14 has an upper open end portion 26 with an exterior flange portion 28 extending radially from the upper open end portion 26 and an internal annular edge or diaphragm seat 30 positioned in the chamber upper end portion 26. The chamber 14 also includes a lower end portion 32 which is positioned above the valve seat 22.

The valve body portion 12 has an upper portion 34 in which a bonnet 36 is axially positioned. The bonnet 36 includes a radially extending flange portion 38 and a lower annular end portion 40. A passageway 42 extends through the bonnet 36. The radially extending flange portion 38 is positioned above the valve body exterior flange portion 28, and the lower annular end portion 40 extends into the chamber upper end portion 26.

The lower annular end portion 40 is positioned on the diaphragm seat 30, and a plurality of combination studs, lock washers and nuts 44 are threadly advanced through the aligned bores 46 and 48 in the bonnet 36 and valve body portion 12 to secure the bonnet 36 to the valve body upper portion 34. Tightening of the combination studs, lock washers, and nuts 44, through the bonnet 36 and into the valve body upper portion 34 urges the bonnet lower annular end portion 40 into bearing engagement with the diaphragm seat 30, as will be explained later in greater detail. For high pressure applications of the valve 10, the combination fasteners are designed to generate a bearing force upon the valve diaphragm in excess of 300,000 lbs.

The valve member 24 includes a valve disc generally designated by the numeral 50 having an enlarged lower end portion 52. The end portion 52 includes a convex surface 54 that is arranged upon closing of the valve to abut and sealingly engage the valve seat 22. The valve disc 50 of the present invention is operable for low lift from the valve seat 22 to a fully open position. The valve disc 50 also includes a cylindrical portion 56 that extends axially upwardly from the lower end portion 52. A threaded shaft 58 is secured to and extends axially from the cylindrical portion 56.

The upper end of the valve member shaft 58 is arranged to extend into an axial bore 60 of a disc cap generally designated by the numeral 62 for the valve member 24. The disc cap 62 is rigidly connected to the upper end of shaft 58 by a pin 64 that extends through aligned horizontal bores of the disc cap 62 and the shaft 58, as illustrated in FIG. 2. The disc cap 62 has an upper convex surface 66.

The upper convex surface 66 of the disc cap 62 is arranged to abut a flexible metal diaphragm generally designated by the numeral 68. The flexible diaphragm 68 is preferably fabricated of steel and heat treated during fabrication. The diaphragm 68 is not shown in section in FIGS. 1 and 2 so that it may be more clearly illustrated. The flexible diaphragm 68 has a preselected diameter preferably in the range of between about 5.75 to 6.0 inches in order to seal the large diameter of the valve chamber 14 having a corresponding diameter dimension. An outer annular flat edge 70 of the diaphragm 68 surrounds a generally hemispherical body portion. The edge 70 is positioned in abutting relation on the diaphragm seat 30 in underlying relation with the bonnet lower annular end portion 40.

By bolting the bonnet flange portion 38 to the valve body upper portion 34, the bonnet lower annular end portion 40 applies a bearing force upon the annular flat edge 70 of the flexible diaphragm 68. This arrangement retains the diaphragm 68 in sealed relation on the diaphragm seat 30 and also permits the diaphragm 68 to be efficiently removed from and replaced in the valve 10. The flexible diaphragm 68 thus provides a fluid tight seal between the chamber portions 26 and 32 sufficient to withstand fluid pressures in excess of 100,000 lbs. in the chamber lower portion 32.

Figure 5:
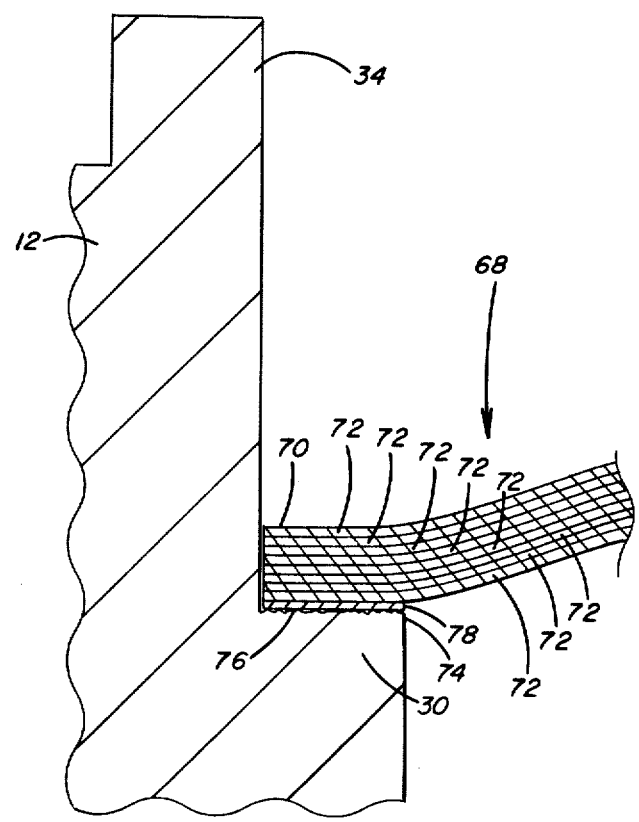
FIG. 5 is an enlarged fragmentary view in section similar to FIG. 4, illustrating a gasket positioned on the roughened surface of the diaphragm seat to increase the sealing engagement of the diaphragm assembly with the seat.

Preferably, the flexible metal diaphragm 68 includes an assembly of individual disc-like, flexible metal diaphragms 72 positioned in stacked, overlying relation to form a composite diaphragm assembly as illustrated in FIG. 5. Most perferably each of the individual diaphragms 72, as illustrated in FIG. 5, has a preselected thickness. For example, a plurality of heat treated, stainless steel diaphragms each having a thickness of 0.009 inches is readily adaptable for use in the present invention. The stacked arrangement is controlled to provide a preselected total diaphragm assembly thickness. A total diaphragm assembly thickness of about 0.081 inches is preferred. The composite stacked arrangement of individual diaphragms 72 is schematically illustrated in FIGS. 1 and 2 where the individual diaphragms are not shown; however, the stacked arrangement of individual diaphragms 72 is illustrated in detail in FIG. 5.

Figure 4:
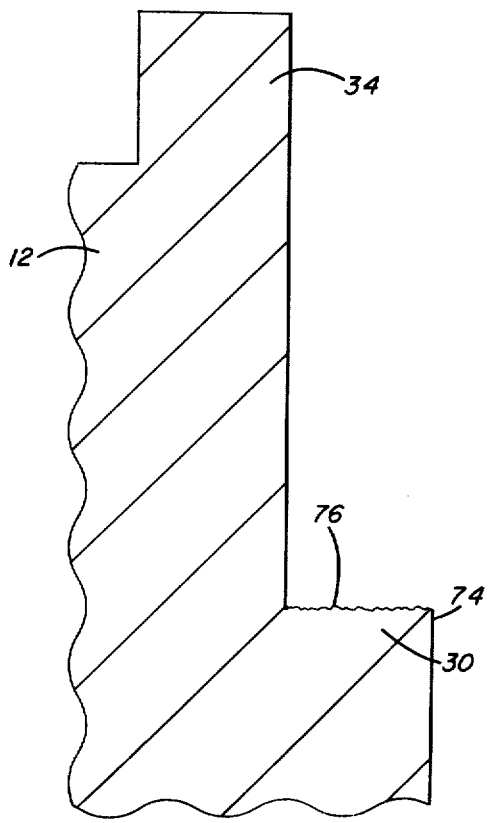
FIG. 4 is an enlarged fragmentary view in section of the upper end of the valve body, illustrating the roughened surface of a diaphragm seat for sealingly engaging a stacked assembly of flexible metal diaphragms positioned on the seat.

Referring to FIG. 4 there is illustrated in greater detail the configuration of the diaphragm seat 30. The flexible diaphragm 68 and the bonnet 36 are not illustrated in FIG. 4 in order to more clearly illustrate the structure of the diaphragm seat 30. Preferably the diaphragm seat 30 is formed by an inner annular shoulder 74. The shoulder 74 projects inwardly from the valve body portion 12 into the chamber upper end portion 26. The shoulder 74 has an upper surface 76 for supporting the diaphragm outer annular flat edge 70 and the bonnet lower annular end portion 40, as illustrated in FIGS. 1 and 2.

The diaphragm seat upper surface 76 is irregular or rough as opposed to being smooth as known with conventional diaphragm valves. More particularly the upper surface 76 is roughened to provide the surface 76 with a preselected magnitude or degree of roughness intended to increase the sealing engagement of the diaphragm outer annular edge 70 with the diaphragm seat 30 to prevent fluid leakage around the annular edge 70. Preferably, the surface 76 of the diaphragm seat 30 has a surface roughness of a magnitude in the range of between about 250 and 500 micro-inches r.m.s. Most preferably the surface roughness is about 500-micro inches r.m.s. By providing a rough diaphragm seat 30, the diaphragm assembly 68 is more effectively engaged in sealing relationship with the seat 30.

By maintaining the diaphragm assembly 68 securely on the diaphragm seat 30 an effective fluid tight seal is maintained between the diaphragm assembly 68 and the valve body 12 capable of withstanding fluid pressures in excess of 2,500 p.s.i. Furthermore, by securely retaining the diaphragm assembly 68 on the diaphragm seat 30 by the provision of the roughened diaphragm seat surface 76, the bonnet lower annular end portion 40 is operable to apply a uniform seat force upon the diaphragm. outer annular edge 70. The diaphragm assembly 68 is then subject to a maximum gripper force which prevents failure of the diaphragm by leakage around the diaphragm assembly 68 between the diaphragm assembly 68 and the valve body 12. This overcomes the problem encountered heretobefore of the bonnet applying a nonuniform bearing force upon the diaphragm outer annular edge 70. With the present invention of a roughened diaphragm seat 30 losses in seat force on the diaphragm assembly 68 are substantially reduced so as to prevent diaphragm leakage and ultimate failure of the diaphragm assembly.

Further in accordance with the present invention as illustrated in FIG. 5, a suitable sealing means such as a compressible gasket 78, having a ring-like structure is positioned on the diaphragm seat roughened surface 76 to in turn, support the lower outer annular flat edge 70 of the flexible diaphragm assembly 68. The bonnet lower annular end portion 40 exerts a downward bearing force upon the upper surface of diaphragm outer annular flat edge 70 to compress the outer annular flat edge 70 of each individual diaphragm 72. The downward bearing force is transmitted through the diaphragm assembly 68 to the compressible gasket 78. The downward bearing force compresses the gasket 78 into frictional engagement with the roughened diaphragm seat surface 76.

Compression of the gasket 78 deforms the gasket 78. Preferably the gasket 78 is fabricated of graphite so that the graphite fibers of the gasket 78 deflect when compressed. Therefore, the graphite fibers on the upper surface of the gasket 78 become engaged with the lower surface of the diaphragm assembly outer annular flat edge 70. The graphite fibers on the lower surface of the gasket 78 become engaged with the seat roughened surface 76. The graphite fibers fill the voids or recesses formed on the roughened surface 76. Thus, the diaphragm assembly 68 becomes locked to the gasket 78, and the gasket 78 becomes locked to the roughened seat surface 76. The surface deformation of the diaphragm assembly 68 and the gasket 78, which occurs as a result of the bonnet bearing force, provides a sealing engagement of the diaphragm assembly 68 on the diaphragm seat 30.

The feature of supporting the individual diaphragms 72 on the gasket 78 in contact with the roughened surface 76 also increases operating or cycle life of the diaphragm assembly 68. Thus a fluid tight seal of the diaphragm assembly 68 on the diaphragm seat 30 is assured. Leakage of fluid around the diaphragm assembly 68 between the diaphragm outer annular flat edge 70 and the valve body 12 is more effectively prevented over the cycle life of the diaphragm assembly 68. Further in accordance with the present invention the gasket 78 is also replaceable with the diaphragm assembly 68 in the valve 10.

Now referring to FIGS. 1 and 2 there is illustrated a spring assembly generally designated by the numeral 80 that acts upon the disc cap 62 to normally maintain the valve member 24 in a low lift, raised position within the valve chamber 14 where the valve disc 50 is removed from contact with the valve seat 22. The spring assembly 80 is positioned in surrounding relation with the threaded shaft 58 and abuts at its upper end portion a thrust washer 82. The thrust washer 72 surrounds the shaft 58 and abuts the lower surface of the disc cap 62. The lower end portion of the spring assembly is also supported by a thrust washer 84. The thrust washer 84 is retained in surrounding relation with the shaft 58 by a valve spring guide 86.

The valve spring guide 86 includes a passageway 88 extending therethrough. The shaft 58 extends through the passageway 88. The passageway 88 includes an enlarged upper end portion 90 that forms with the body of the guide 86 a receptacle for receiving the spring assembly 80. The thrust washer 84 is supported by the spring guide 86 in the passageway upper enlarged end portion 90.

A lower reduced end portion 92 of passageway 88 receives a tubular guide ring 94. The guide ring 94 is positioned in surrounding and closely adjacent relationship with the shaft 58. The guide ring 94 is supported by an inturned shoulder 96 at the lower end of the valve spring guide 86.

The valve body portion 12 surrounding the chamber upper end portion 26 includes an inwardly extending shoulder 98 on which a lip 100 of the valve spring guide 86 is positioned. With this arrangement the valve spring guide 86 is restrained from downward axial movement within the chamber 14. The valve member shaft 58 extends through the axial bore of the guide ring 94. Preferably the ring guide 94 is fabricated of a highly wear resistant material to resist wear by upward and downward axial movement of the shaft 58 in the ring guide 94.

The ring guide 94 is closely fitted to the dimensions of the shaft 58 so that the shaft 58 is maintained in a concentric position within the chamber 14 as it is raised and lowered to open and close the valve 10. This is particularly important for valves having the inlet and outer openings 16 and 18 of a relatively large diameter, i.e. a diameter in the range of three and four inches, and a diaphragm seat diameter of about six inches as with the present valve 10.

It is a principal feature of the ring guide 94 to maintain the valve member shaft 58 concentrically positioned within the chamber 14. This assures that the valve disc 50 is maintained in concentric relationship with the valve seat 22. The spring guide 94, being supported by the valve spring guide 86 in surrounding concentric relation with the valve member shaft 58, maintains a concentric relationship of the valve disc 50 with the valve seat 22. Thus when the valve is closed positive seating of the convex surface 54 of the valve disc 50 with the valve seat 22 is obtained.

The spring assembly 80 is maintained in surrounding concentric relation with the shaft 58 within the valve spring guide 86. Preferably, the spring assembly 80 is a Belleville spring assembly having an upper surface abutting the thrust washer 82 that is maintained in abutting relation with the disc cap 62 and a lower surface abutting the thrust washer 84 that is supported by valve spring guide 86. The Belleville spring assembly 80 includes a plurality of spring washers arranged in a series stack, i.e. one on top of the other within the enlarged upper end portion 90 of the guide passageway 88.

Each of the spring washers of the spring assembly 80 has the configuration of a frustum of a cone with an inner diameter surrounding the shaft 58 and an outer diameter positioned closely adjacent to the valve spring guide 86. The number of spring washers utilized is determined by the thrust required to overcome the mass of the valve member 24 and urge the valve member 24 to a normally open position. Thus, the spring force generated by the Belleville spring assembly 80 is adjustable as determined by the number of individual spring washers utilized in the assembly. Further details of the Belleville spring assembly are disclosed in the U.S. Pat. No. 4,151,979 which is incorporated herein by reference.

As illustrated in FIGS. 1 and 2 a yoke member generally designated by the numeral 102 is positioned in surrounding relation with the bonnet 36 and includes an axial passageway 104 for receiving a valve stem 106. The yoke member 102 includes an upper flange portion 108, an intermediate portion 110, and a lower flange portion 112. The upper and lower flange portions 108 and 112 extend radially from the intermediate portion 110. The lower flange portion 112 is positioned in overlying abutting relation with the valve body exterior flange portion 28. The lower flange portion 112 is also positioned in spaced surrounding relation with the bonnet flange portion 38. With this arrangement the bonnet 36 is positioned within the yoke member 102 but removed from contact therewith.

Suitable connecting means, such as bolts 114, lock washers 116, and nuts 118 extend through aligned vertical bores in the abutting flange portions 28 and 112 of the valve body 12 and the yoke member 102 to securely connect the yoke member 102 to the upper end portion 26 of the valve body 12. The yoke member upper flange portion 108 is, in turn, connected to a valve actuator generally designated by the numeral 120. The valve actuator 120 is connected to valve casting 122 having an external flange portion 124 forming a chamber 126. The casting flange portion 124 and the yoke member flange portion 108 are positioned in abutting relation and include aligned bores for receiving threaded fasteners that include a combination of bolts 128 and nuts 130 to thereby securely connect the valve casting 122 to the yoke member 102.

A bushing 132 is rotatably positioned within the yoke member upper flange portion 108 in surrounding relation with the valve stem 106. The bushing 132 is rotatably supported within the yoke member 102 by bearing assemblies 134. The bearing assemblies 134 are longitudinally spaced on the bushing 132 and are carried by the yoke member intermediate portion 110. The bushing 132 includes an elongated cylindrical body portion 136 with an axial passageway 138 therethrough. The passageway 138 includes an upper threaded portion 140. A cover plate 142 is positioned on the yoke member upper flange portion 108 and is secured thereto by suitable fastening devices 144 that extend into threaded engagement with aligned holes in the cover plate 142 and the yoke member upper flange portion 108.

The cover plate 142 has an axial passageway 146 throughwhich the upper end portion of the bushing 132 extends. A suitable seal 148 is positioned in the passageway 146 of the cover plate 142 in sealing engagement with the outer cylindrical surface of the bushing 132. A seal retainer 150 is positioned on the cover plate 142 in overlying relation with the seal 148. The bushing 132 also extends through an axial passageway of the seal retainer 150. Cap screws 152 extend through the seal retainer 150 into the cover plate 142 to retain the seal 148 in sealing relation with the bushing 132.

The cover plate 142 also supports an O-ring seal 154 in sealing relation with the interior surface of the yoke member upper flange portion 108. With this arrangement the bearing assemblies 134 are sealed within the yoke member 102. A lubricating fitting 156 extends through the yoke member 102 for supplying the bearing assemblies 134 with lubricant.

As stated above, the valve stem 106 extends through the yoke member passageway 104 and includes a threaded upper portion 158 that extends through the bushing passageway 138. The stem threaded upper portion 158 is threadedly engaged to the bushing passageway threaded portion 140, as diagrammatically illustrated in FIGS. 1 and 2. The valve stem 106 includes a lower portion 160 that extends through the bonnet passageway 42. An enlarged stem head 162 is connected by a stem pin 164 to the stem lower portion 160. The stem head 162 abuts the top surface of the flexible diaphragm assembly 68 opposite the upper convex surface 66 of the disc cap 62. The stem head 162 is convexly shaped to distribute the stem force uniformly on the top surface of the flexible diaphragm assembly. This arrangement prevents a concentration of stem force upon the diaphragm top surface and thereby prevents diaphragm failure attributed to stem force concentration.

The bonnet 36 includes an annular recessed portion 166 surrounding the bonnet passageway 42. A plurality of packing rings 168 are positioned within the recessed portion 166. The packing rings 168 may be fabricated of a fabric-type material, such as graphite filament yarn. They also may be wire reinforced. The packing rings 168 sealingly surround the valve stem lower portion 160 to prevent leakage of fluid upwardly through the passageway 42 of the bonnet 36. The packing rings 168 engage the stem lower portion 160 in a manner to permit reciprocating movement of the stem lower portion 160 in the bonnet 36.

A metallic circular follower member 170 is positioned in abutting relation with the top surface of the packing rings 168. A follower plate 172 is positioned in overlying abutting relation with the follower member 170 and surrounds the valve stem lower portion 160. The follower plate 172 is arranged to bear upon the follower member 170. The follower plate 172, as seen in FIG. 1, has a pair of internally threaded bores 174 positioned oppositely of a corresponding pair of bores 176 in the bonnet 36. Suitable fastening devices, such as bolts 178, are threadedly advanced through the bores 174 and are suitably secured to the bonnet 36 in the bores 176. With this arrangement the bolts 178 connect the follower plate 172 to the bonnet 36 and thereby apply compressive forces through the follower plate 172 and the follower member 170 to the packing rings 168.

By applying compressive forces to the packing rings 168, a fluid and pressure tight seal is provided between the outer sealing surface of the valve stem lower portion 18 and the inner sealing surface of the bonnet 36 in the annular recessed portion 166. Accordingly, the bolts 178 may be adjusted to apply preselected levels of compressive force to the packing rings 168 to maintain a fluid and pressure tight seal within the bonnet passageway 42.

Figure 3:
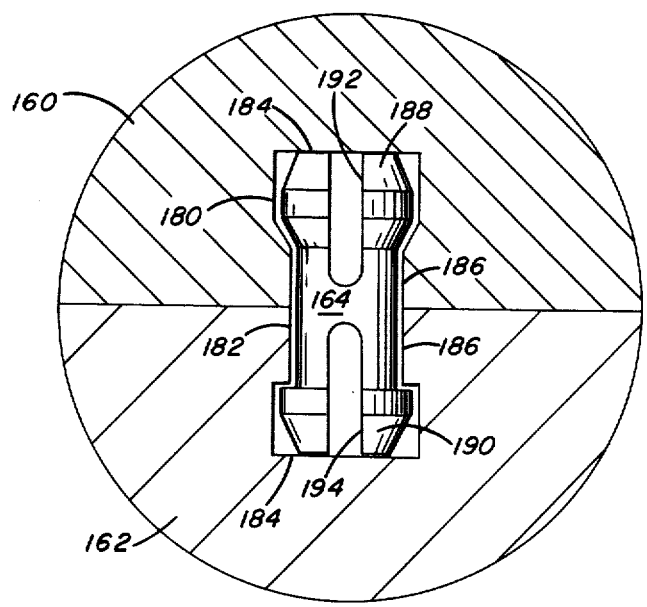
FIG. 3 is an enlarged fragmentary view in section of a stem pin for connecting a stem head to a valve stem of the diaphragm valve shown in FIGS. 1 and 2.

Now referring to FIG. 3 there is illustrated in greater detail the connection of the valve stem lower portion 160 to the stem head 162 by the stem pin 164. The stem lower portion 160 has a cylindrical recess 180 positioned oppositely of a cylindrical recess 182 in the stem head 162. Each of the recesses 180 and 182 has an enlarged end portion 184 and a reduced end portion 186. The reduced end portions 186 of the recesses 180 and 182 are oppositely positioned in alignment to permit the stem pin 164 to extend between the respective recesses.

The stem pin 164 has tapered end portions 188 and 190. The respective end portions 188 and 190 are bifurcated by slots 192 and 194 respectively. With this arrangement the tapered end portions 184 and 186 are radially compressible to facilitate insertion of the tapered end portions 188 and 190 through the restricted portions 186 into the enlarged portions of the respective cylindrical recesses 180 and 182.

For example, when the tapered end portion 188 is advanced through the restricted portion 186 of recess 180, the end portion 188 is compressed to a degree to permit the end portion 188 to pass freely through the restricted portion 186 into the enlarged portion 184. When the end portion 188 moves into the enlarged portion 184, the end portion 188 expands outwardly to substantially occupy the enlarged portion 184 of the recess 180. The end portion 188 is then prevented from being withdrawn from the recess 180 in the valve stem lower portion 160.

A similar arrangement is also provided for the stem pin tapered end portion 190. The end portion 190 is compressed as it is advanced through the restricted portion 186 into the enlarged portion 184 of the recess 182 in the stem head 162. Once the end portion 190 reaches the enlarged portion 184 the bifurcated sections of the end portion 190 expand outwardly. This prevents withdrawal of the stem pin end portion 190 from the recess 182 in the stem head 162.

The function of the stem pin 164 is to lift the weight of the stem head 162 only. Thus, the stem pin 164 can be very small in view of the fact that it is not subjected to torsional shear stresses. In this regard, the stem pin 164 connects the stem head 162 to the valve stem lower portion 160 without transmitting shear forces from the stem head 162 to the stem pin 164.

As discussed above, the bushing 132 is rotatably supported within the yoke member 102 by the bearing assemblies 134. Thus, the bushing 132 is rotatable within the axial passageway 146 of the cover plate 142. The cover plate 142 is rigidly secured to the yoke member 102 by the threaded fasteners 144. On the other hand, the bushing 132 is nonrotatably connected to the valve stem upper threaded portion 158. The valve stem upper threaded portion 158 extends upwardly through the bushing threaded passageway 140 into an adapter 196. The adapter 196 has flats 214 arranged to engage flats 216 on the upper end of the bushing 132 to thereby nonrotatably connect the adapter 196 to the bushing 132. The adapter 196 is drivingly connected to the drive gearing of the valve actuator 120.

As illustrated in FIGS. 1 and 2, the valve casting 122 is releasably connected to a housing 210 of the valve actuator 120 by a plurality of threaded bolts 202 that extend through the casting 122 into the housing 210. The valve actuator 120 is a commercially available actuator, and in accordance with the present invention the connection of the valve stem 106 and bushing 132 by the adapter 196 to the valve actuator 120 permits the valve 10 to be used with more than one type of commercially available valve actuator. For example a known commercially available valve actuator adaptable for use with the diaphragm valve 10 of the present invention is a manufactured and sold by Limitorque Corp.

The valve actuator 12 illustrated in FIGS. 1 and 2 is a manually operated valve actuator and includes a handwheel 204. The handwheel 204 is splined to a shaft 206 that extends into a housing 208. The shaft 206 is, in turn, connected through a gear train (not shown) of the valve actuator 120 within the housing 210 to a bushing 203 of the valve actuator 120. The casting 122 includes an opening 209 and the bushing 203 extends into the opening 209. A collar 211 of the adapter 196 is also positioned within the opening 209. The adapter collar 211 is positioned within the lower end of the bushing 203. The adapter collar 211 is provided with a plurality of flats 205. The bushing 203 is also provided with a plurality of flats 207 that surround and nonrotatably engage the adapter collar flats 205. Thus the collar 211 is nonrotatably connected to the adapter 196 in a manner to permit the adapter 196 to be released from the collar 211 and the entire actuator 120.

As further illustrated in FIGS. 1 and 2 the adapter 196 has a lower end portion 210 provided with flats 214 that are removably engageable with flats 216 on the upper end of the bushing 132. With this arrangement rotation is transmitted through the gear train of the valve actuator 120 to the adapter 196 and therefrom to the bushing 132. The above described arrangement of connecting the valve actuator 210 to the valve 10 facilitates an exchange of actuators on the valve 10 so that more than one type of valve actuator or operator can be utilized with the present invention.

Different types of valve actuators can be used with the valve 10 of the present invention. A manual arrangement is shown in FIGS. 1 and 2; however, other types can also be connected to the valve casting 122, such as an air-hydraulic valve actuator, an automatic mechanical valve actuator, an electrically operated valve actuator, or the like as known in the art.

In operation rotation of the handwheel 204 in a preselected direction to open or close the valve rotates the adapter 196. Rotation of the adapter 196 is transmitted to bushing 132 to rotate the bushing 132 relative to the cover plate 142. The bushing 132 is axially fixed within the yoke member upper portion 108 so that the rotation of the bushing 132 in a preselected direction moves the valve stem 106 longitudinally in the bushing 132, the yoke member 102, and the bonnet 36 either upwardly to open the valve or downwardly to close the valve.

As described above, the valve stem upper end portion 158 is threaded connected to the bushing 132; therefore, as the bushing 132 rotates and remains axially fixed the valve stem 106 moves axially without rotating. The valve stem 106 moves downwardly to advance the stem head 162 and the flexible diaphragm assembly 68 downwardly. The downward movement of the stem head 162 and the flexible diaphragm assembly 68 is transmitted through the disc cap 62 and the shaft 58 to the valve disc 50. Thus, to close the valve the valve disc 50 is moved into abutting and sealed relation with the valve seat 22 by rotation of the handwheel 204. The spring assembly 80 moves the valve disc 50 away from the valve seat 22 when the handwheel 204 is rotated in a direction to raise the stem head 162 and the flexible diaphragm assembly 68 upwardly within the bonnet passageway 42.

In operation when the valve disc 50 is seated against maximum fluid line pressure between the valve inlet and outlet openings 16 and 18, locking friction is generated between the valve stem 106 and the rotatable bushing 132. The locking friction generated tends to apply torsional forces to the valve stem to rotate the valve stem 106. Therefore, to resist the torsional forces applied to the valve stem 106 when the valve disc 50 is being closed against maximum line pressure a stem stop plate assembly, generally designated by the numeral 218 in FIGS. 1 and 2 is mounted on the valve stem 106 to resist the torque applied to the valve stem 106.

The stem stop plate assembly 218 includes a keeper 220 that is nonrotatably connected to flats 222 on the valve stem 106. The keeper 220, in turn, engages a pair of internal flats 224 of the yoke member 102. With this arrangement, the keeper 220 is secured against rotation by its engagement with the yoke member 102 and is rigidly connected to the valve stem 106. The connection of the keeper 220 to the yoke member 102 resists the torsional forces that are applied to the valve stem 106 by the bushing 142. The connection of the keeper 220 to the yoke member 102 prevents rotation of the valve stem 106. The keeper 220 is retained nonrotatably connected to the valve stem 106 by a face plate 226. The face plate 226 is secured to the keeper 220 by cap screws 228. This arrangement retains the keeper 220 connected to the valve stem flats 222.

Further in accordance with the present invention, by connecting the yoke member 102 to the valve body 12 by bolting together the oppositely positioned flange portions 28 and 112 of the valve body 12 and the yoke member 102, the upward thrust which is exerted upon the valve stem 106 when valve disc 50 is closed against maximum line pressure is not transmitted to the bonnet 36. As experienced heretofore when the bonnet is connected to the valve body the upward thrust on the valve stem is transmitted to the bonnet with the subsequent effect of reducing the gripper or bearing force exerted by the bonnet on the flexible diaphragm assembly.

A reduction in the gripper or bearing force applied by the bonnet on the diaphragm assembly is known to result in an unequal distribution of bearing force upon the upper surface of the diaphragm assembly. This is true particularly for the arrangement where the bonnet is bolted to the valve body with a relatively large bolt circle on the bonnet. The upward stem thrust, if transmitted to the bonnet, deflects the bolts that secure the bonnet to the valve body. Linear deflection of the bolts loosens the bolts resulting in diaphragm leakage around the periphery of the diaphragm assembly. Diaphragm leakage eventually results in failure of the diaphragm assembly which occurs by pressure blow-out of the diaphragm assembly in the valve body. This can have a disastrous effect, particularly in high pressure nuclear safety valves and containment valves that control the flow of radioactive fluids.

However, with the present invention, this problem is averted by transmitting the upward thrust upon the valve stem 106 through the bearing assemblies 134 to the yoke member 102 and eventually to the valve body 12. In addition to thrust forces being transmitted by the valve stem 106, radial forces to a lesser extend are transmitted by the valve stem 106. Thus the total stem load is a combination of thrust and radial loads. The bearing assemblies 134 are operable as composite bearings to carry both the thrust and radial loads from the valve stem. By rotatably supporting bushing 132 bearing assemblies 134 transmit the total stem load applied by the valve stem 106 through the bushing 132 to the yoke member 102. The stem load is further transmitted downwardly through the yoke intermediate portion 110 to the flange portion 108 and therefrom to the valve body 12.

Thus, the stem load including the thrust and radial forces are removed from the bonnet 36 and are applied to the yoke member 102 and the valve body 12 where the forces are absorbed without a reduction in the bearing force exerted by the bonnet 36 on the diaphragm assembly 68. A further advantage of this arrangement is the reduction in the bolt circle of the bonnet 36 because the bonnet bolts 44 are subject to a lower force requirement when the stem thrust and radial forces are not carried by the bonnet 36.

In the past in order to withstand the upward thrust that is transmitted from the valve stem to the bonnet it has been necessary to provide the bonnet with a relatively large diameter bolt circle to maintain the diaphragm assembly in sealed engagement with the valve body. Accordingly, by transmitting the stem thrust to the valve body 12 with the present invention instead of to the bonnet 36 the force generated by the bolted connection of the bonnet 36 to the valve body 12 is reduced.

A reduction in the bolt force permits a reduction in the number of bolts 44 connected to the bonnet 36. Accordingly, the bonnet bolt circle diameter is reduced. This arrangement also permits the bonnet 36 to be positioned within the yoke member 102 without being connected to the yoke member 102. Consequently efficient access is provided to the bonnet 36 to disconnect the bonnet 36 from the valve body 12 to permit the diaphragm assembly 68 to be easily replaced after completion of a preselected number of operational cycles.

By subjecting the bolts 44 in the bonnet 36 to a significantly lower force requirement, linear deflection of the bolts 44 is prevented. This assures that maximum bearing force is maintained by the bonnet 36 on the flexible diaphragm assembly 68. An effective fluid tight seal is maintained around the flexible diaphragm assembly 68 on the diaphragm seat 30. By preventing leakage around the flexible diaphragm assembly 68 the operational, cycle life of the individual diaphragms 72 is extended. Also the possibility of premature diaphragm leakage and diaphragm failure by pressure blow-out is substantially reduced.

According to the provisions of the Patent Statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A diaphragm valve comprising,
   a valve body having a chamber therein with an upper portion and a lower portion,
   said valve body having an exterior flange portion extending radially from said chamber upper portion and an internal annular edge positioned in said chamber upper portion,
   said lower portion having inlet and outlet openings communicating with said chamber lower portion,
   a valve seat in said chamber lower portion between said inlet and outlet openings,
   a valve member positioned for axial movement in said chamber lower portion in overlying relation with said valve seat to control the flow of fluid through said chamber lower portion between said inlet and outlet openings, a flexible diaphragm positioned in said chamber in overlying with said valve member and supported by said valve body internal annular edge, said flexible diaphragm being arranged to seal said chamber lower portion from said chamber upper portion, said flexible diaphragm having a top surface and a bottom surface, said valve member being positioned in abutting relation with said diaphragm bottom surface, a bonnet positioned in said chamber upper portion in overlying abutting relation with said flexible diaphragm on said valve body internal annular edge, said bonnet having a radially extending flange portion positioned above said valve body flange portion, first fastener means extending through said bonnet flange portion and into said valve body flange portion in surrounding relation and adjacent to said chamber upper portion for rigidly connecting said bonnet flange portion to said valve body to securely retain said bonnet in gripping engagement with said flexible diaphragm on said valve body internal annular edge, said bolts being arranged in a circular pattern around said bonnet flange portion in spaced relation to said yoke member radially extending flange, said bonnet having a passageway therethrough, a valve stem extending through said bonnet passageway for longitudinal movement relative thereto, said valve stem having a lower end portion abutting said diaphragm top surface and an upper end portion, actuator means connected to said valve stem upper end portion for moving said valve stem to transmit movement through said flexible diaphragm to said valve member for closing and opening said valve, a yoke member positioned in surrounding relation with said bonnet and said valve stem between said valve body and said actuator means, said yoke member having an upper end portion and a lower end portion, said yoke member lower end portion having a radially extending flange positioned in overlying abutting relation with said valve body exterior flange portion, said yoke member flange being positioned in spaced surrounding relation with said bonnet flange portion, second fastener means including bolts for connecting said yoke member radially extending flange to said valve body exterior flange portion, said bolts being arranged in a circular pattern adjacent the outer periphery of said valve body exterior flange portion, said bonnet being positioned concentrically within said yoke member and removable from connection with said valve body relative to said yoke member which remains connected to said valve body to permit replacement of said flexible diaphragm in said chamber, said bolts connecting said bonnet to said valve body being arranged in a circular pattern around said bonnet flange portion in spaced relation to said yoke member radially extending flange and within the circle of said bolts connecting said yoke member flange to said valve body flange, and said valve stem being supported for longitudinal movement in said yoke member so that stem thrust applied upwardly to said valve stem upon closing said valve member under pressure is transmitted through said yoke member to said valve body and isolated from said bonnet to thereby relieve said bonnet of forces acting to disengage said bonnet from gripping engagement with said flexible diaphragm.

2. A diaphragm valve as set forth in claim 1 which includes, a bearing assembly axially supported in said yoke member upper end portion, a bushing rotatably supported by said bearing assembly, said bushing having a threaded axial passageway therethrough, said valve stem upper end portion being threadedly engaged to said bushing threaded passageway, said valve stem being nonrotatably, longitudinally movable relative to said bushing upon rotation of said bushing, and said valve stem being arranged to transmit upward fluid thrust forces applied to said valve member to said bushing and bearing assembly for transfer to said yoke member and said valve body and away from said bonnet.

3. A diaphragm valve as set forth in claim 1 which includes, a bushing rotatably supported within said yoke member upper end portion, said bushing having a threaded axial passageway for threaded engagement with said valve stem upper end portion, said bushing having an upper end portion with external flats, an adapter removably, nonrotatably connected at one end to said acuator means to permit an exchange of actuator means on said diaphragm valve, and said adapter having a lower end with external flats engaging said bushing external flats to nonrotatably connect said adapter to said bushing to transmit rotation from said actuator means to said bushing to nonrotatably, longitudinally move said valve stem relative to said bushing.

4. A diaphragm valve as set forth in claim 1 which includes, said valve stem having diametrically opposed flats, a keeper positioned on said valve stem and arranged to engage said valve stem flats, said yoke member having an axial passageway for receiving said valve stem and a pair of internal flats provided on said yoke member positioned oppositely of said valve stem flats, said keeper arranged to engage said yoke member flats to prevent rotation of said keeper, and a plate member engageable with said keeper to retain said keeper in engagement with said valve stem and said yoke member to resist torsional forces applied to said valve stem and provide nonrotational longitudinal movement of said valve stem in said valve.

5. A diaphragm valve as set forth in claim 1 in which, said valve body internal edge has a surface for supporting said flexible diaphragm, and said surface having a preselected degree of roughness to increase the bearing contact of said flexible diaphragm bottom surface on said valve body internal edge to prevent displacement of said diaphragm by the hydrostatic forces applied by the fluid in the valve against said diaphragm and sealingly engage said flexible diaphragm to said internal edge.

6. A diaphragm valve as set forth in claim 5 which includes, said surface of said valve body internal edge having a roughness of a magnitude in the range of between about 250 micro-inches r.m.s to 500 micro-inches r.m.s.

7. A diaphragm valve as set forth in claim 5 which includes, said surface of said valve body internal edge having a roughness of a magnitude of about 500 micro-inches r.m.s.

8. A diaphragm valve as set forth in claim 5 which includes, a compressible gasket positioned on said surface of said valve body internal edge in underlying abutting relation with said flexible diaphragm bottom surface, said gasket being compressed between the rough surface of said valve body internal edge and said flexible diaphragm by a downward bearing force applied by said bonnet to flexible diaphragm, and said compressed gasket being deformed into engagement with said rough surface to lock together in sealing relation said flexible diaphragm and said valve body internal edge to prevent fluid leakage around said flexible diaphragm.

9. A diaphragm valve as set forth in claim 1 in which, said valve stem lower end portion includes a recess, a stem head arranged to abut said flexible diaphragm top surface, said stem head having a recess aligned with said valve stem lower end portion recess, a stem pin positioned in said aligned recesses for connecting said stem head to said valve stem lower end portion to prevent relative rotation between said valve stem lower end portion and said stem head and rotation said stem head on said diaphragm, and said stem pin having a body portion operable to expand and contract to facilitate insertion and retention of said stem pin in said aligned recesses.

10. A diaphragm valve as set forth in claim 1 which includes, resilient means positioned in said chamber lower portion in surrounding relation with said valve member for normally urging said valve member upwardly out of contact with said valve seat, a spring guide positioned in said chamber lower portion in surrounding relation with said valve menber, said spring guide having a receptacle for receiving said resilient means to support said resilient means on said valve member, a ring guide surrounding said valve member, said spring guide having a lower passageway for receiving and supporting said ring guide, and said ring guide being positioned in said chamber lower portion between said spring guide and said valve member to maintain said valve member concentrically positioned in said chamber lower portion to assure sealing engagement of said valve member with said valve seat to close said valve.

11. A diaphragm valve as set forth in claim 1 in which, said flexible diaphragm includes a plurality of individual flexible metallic diaphragms positioned in overlying abutting relation to form a composite diaphragm assembly, and said individual flexible metallic diaphragms each having a thickness of about 0.009 inches and a diameter in the range of between about 5.75 to 6.0 inches to thereby form said composite diaphragm assembly having a thickness of about 0.081 inches and a diameter in the range of between about 5.75 to 6.0 inches.

12. A diaphragm valve comprising, a valve body having a chamber therein with an upper portion and a lower portion, said lower portion having inlet and outlet openings communicating with said chamber lower portion, a valve seat in said chamber lower portion between said inlet and outlet openings, a valve member positioned for axial movement in said chamber lower portion in overlying relation with said valve seat to control the flow of fluid through said chamber lower portion between said inlet and outlet openings, a flexible diaphragm positioned in said chamber in overlying relation with said valve member and arranged to seal said chamber lower portion from said chamber upper portion, said valve body having a diaphragm seat surrounding said chamber upper portion, said flexible diaphragm having an annular edge portion supported by said diaphragm seat to position said flexible diaphragm in said chamber, said diaphragm seat having a plurality of recesses forming a roughened surface with a preselected degree of roughness to increase the sealing engagement of said diaphragm annular edge portion with said diaphragm seat, a compressible gasket fabricated of graphite and positioned on said diaphragm seat roughened surface, said gasket having a ring-like structure of a preselected width, said gasket including a lower surface extending along the entire width thereof in overlying abutting relation with said diaphragm seat roughened surface, said gasket including an upper surface extending along the entire width thereof in underlying abutting relation with said diaphragm annular edge portion, said gasket being compressed along the entire width thereof between said diaphragm seat roughened surface and said diaphragm annular edge portion, a bonnet positioned in said chamber upper portion in overlying relation with said diaphragm, said bonnet having a passageway therethrough, a valve stem extending through said bonnet passageway for longitudinal movement relative thereto, said valve stem having a lower end abutting the top surface of said diaphragm and being operable to transmit movement through said diaphragm to said valve member for opening and closing said valve, said bonnet having a lower annular end portion extending into said chamber upper portion and positioned in abutting relation with the top surface of said diaphragm annular edge portion, said bonnet lower annular end portion exerting a downward bearing force upon said diaphragm annular edge portion to, in turn, compress said graphite gasket into frictional engagement with said diaphragm seat roughened surface, and said graphite gasket being composed of fibers being compressed into the recesses of said diaphragm seat roughened surface upon compression of said gasket to engage said fibers on said gasket upper surface to said diaphragm annular edge portion and to engage said fibers on said gasket lower surface to said diaphragm seat roughened surface to lock in sealing engagement said diaphragm to said gasket and said gasket to said diaphragm seat roughened surface and prevent movement of said diaphragm on said diaphragm seat roughened surface.

13. A diaphragm valve as set forth in claim 12 in which,
   said diaphragm seat surface has a roughness of a magnitude in the range of between about 250 micro-inches r.m.s to 500 micro-inches r.m.s.

14. A diaphragm valve as set forth in claim 12 in which,
   said diaphragm seat surface has a roughness of a magnitude of about 500 micro-inches r.m.s.

15. A diaphragm valve as set forth in claim 12 in which,
   said flexible diaphragm includes a plurality of individual flexible metallic diaphragms positioned in overlying abutting relation to form a composite diaphragm assembly, and
   said individual flexible metallic diaphragms each having a thickness of about 0.009 inches and a diameter in the range of between about 5.75 to 6.0 inches to thereby form said composite diaphragm assembly having a thickness of about 0.081 inches and a diameter in the range of between about 5.75 to 6.0 inches.

* * * * *